(12) United States Patent
Perlin et al.

(10) Patent No.: US 10,416,756 B2
(45) Date of Patent: Sep. 17, 2019

(54) FOOT OPERATED NAVIGATION AND INTERACTION FOR VIRTUAL REALITY EXPERIENCES

(71) Applicants: Kenneth Perlin, New York, NY (US); Charles Hendee, Manteca, CA (US)

(72) Inventors: Kenneth Perlin, New York, NY (US); Charles Hendee, Manteca, CA (US)

(73) Assignees: New York University, New York, NY (US); Tactonic Technologies, LLC, New York, NY (US)

( * ) Notice: Subject to any disclaimer, the term of this patent is extended or adjusted under 35 U.S.C. 154(b) by 0 days.

(21) Appl. No.: 16/173,636

(22) Filed: Oct. 29, 2018

(65) Prior Publication Data

US 2019/0064921 A1 Feb. 28, 2019

Related U.S. Application Data

(63) Continuation of application No. 15/362,438, filed on Nov. 28, 2016, now Pat. No. 10,133,343.

(60) Provisional application No. 62/262,125, filed on Dec. 2, 2015.

(51) Int. Cl.
*G02B 1/00* (2006.01)
*G06F 3/01* (2006.01)
*G06F 3/033* (2013.01)
*G02B 27/01* (2006.01)

(52) U.S. Cl.
CPC ............ *G06F 3/011* (2013.01); *G02B 27/017* (2013.01); *G06F 3/017* (2013.01); *G06F 3/0334* (2013.01); *G02B 2027/014* (2013.01); *G02B 2027/0141* (2013.01); *G02B 2027/0187* (2013.01)

(58) Field of Classification Search
CPC .......... G06F 3/048; G06F 3/011; G06F 3/016; G06F 1/00; G02B 27/01; G02B 1/00; G06K 9/00
See application file for complete search history.

(56) References Cited

U.S. PATENT DOCUMENTS 9,459,454 B1* 10/2016 The ...................... G02B 27/017
2016/0054837 A1* 2/2016 Stafford .................. G06F 3/012
463/33
2016/0070101 A1* 3/2016 Nishizawa ......... G06K 9/00791
345/8

* cited by examiner

*Primary Examiner* — Michael A Faragalla
(74) *Attorney, Agent, or Firm* — Ansel M. Schwartz

(57) ABSTRACT

An apparatus for creating movement in a virtual reality for a user includes a computer includes a virtual reality headset in communication with the computer that is worn on the head of the user so the user sees the virtual reality shown by the headset and produced by the computer in the headset. The apparatus includes a foot controller in communication with the computer against which the user moves at least one of his feet to create control signals with the foot to cause movement in the virtual reality. A method for creating movement in a virtual reality for a user having the steps of the user seeing the virtual reality shown by a virtual headset and produced by a computer in the headset, a virtual reality headset in communication with the computer that is worn on the head of the user. There is the step of the user moving at least one of his feet against a foot controller to create control signals with the foot to cause movement in the virtual reality by the computer, the foot controller in communication with the computer. A computer software program for creating movement in a virtual reality for a user.

8 Claims, 2 Drawing Sheets

FOOT OPERATED NAVIGATION AND INTERACTION FOR VIRTUAL REALITY EXPERIENCES

CROSS-REFERENCE TO RELATED APPLICATIONS

This is a continuation of U.S. patent application Ser. No. 15/362,438 filed Nov. 28, 2016, which is a nonprovisional of U.S. provisional application Ser. No. 62/262,125 filed Dec. 2, 2015, incorporated by reference herein.

FIELD OF THE INVENTION

The present invention is related to creating movement in a virtual reality using a foot controller. (As used herein, references to the "present invention" or "invention" relate to exemplary embodiments and not necessarily to every embodiment encompassed by the appended claims.) More specifically, the present invention is related to creating movement in a virtual reality using a foot controller where the foot controller creates signals that are used by a computer to create movement in the virtual reality shown by a headset.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Virtual reality allows a user to enter a world created by electronics, such as with a computer and a virtual reality display and a controller. It is with the controller that the user interacts with the virtual reality world and effect actions and changes to the virtual reality world. Hand controllers are commonly considered to provide input by the user to the computer to effect the virtual reality world. However, the use of hand controllers have limitations in that there are only so many movements you can do by moving your hand and the fingers of the hand to cause input signals.

BRIEF SUMMARY OF THE INVENTION

The present invention pertains to an apparatus for creating movement in a virtual reality for a user. The apparatus comprises a computer. The apparatus comprises a virtual reality headset in communication with the computer that is worn on the head of the user so the user sees the virtual reality shown by the headset and produced by the computer in the headset. The apparatus comprises a foot controller in communication with the computer against which the user moves at least one of the user's feet to create control signals with the foot to cause movement in the virtual reality.

The present invention pertains to a method for creating movement in a virtual reality for a user. The method comprises the steps of the user seeing the virtual reality shown by a virtual headset and produced by a computer in the headset, a virtual reality headset in communication with the computer that is worn on the head of the user. There is the step of the user moving at least one of his feet against a foot controller to create control signals with the foot to cause movement in the virtual reality by the computer, the foot controller in communication with the computer.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
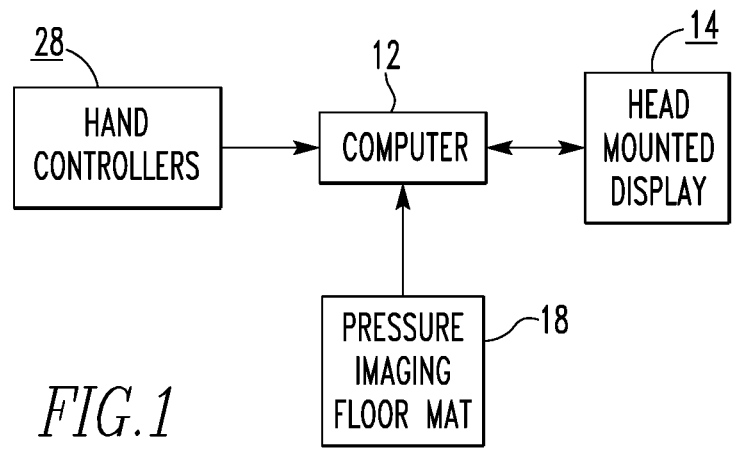
FIG. 1 is a block diagram of the present invention.
Figure 2:
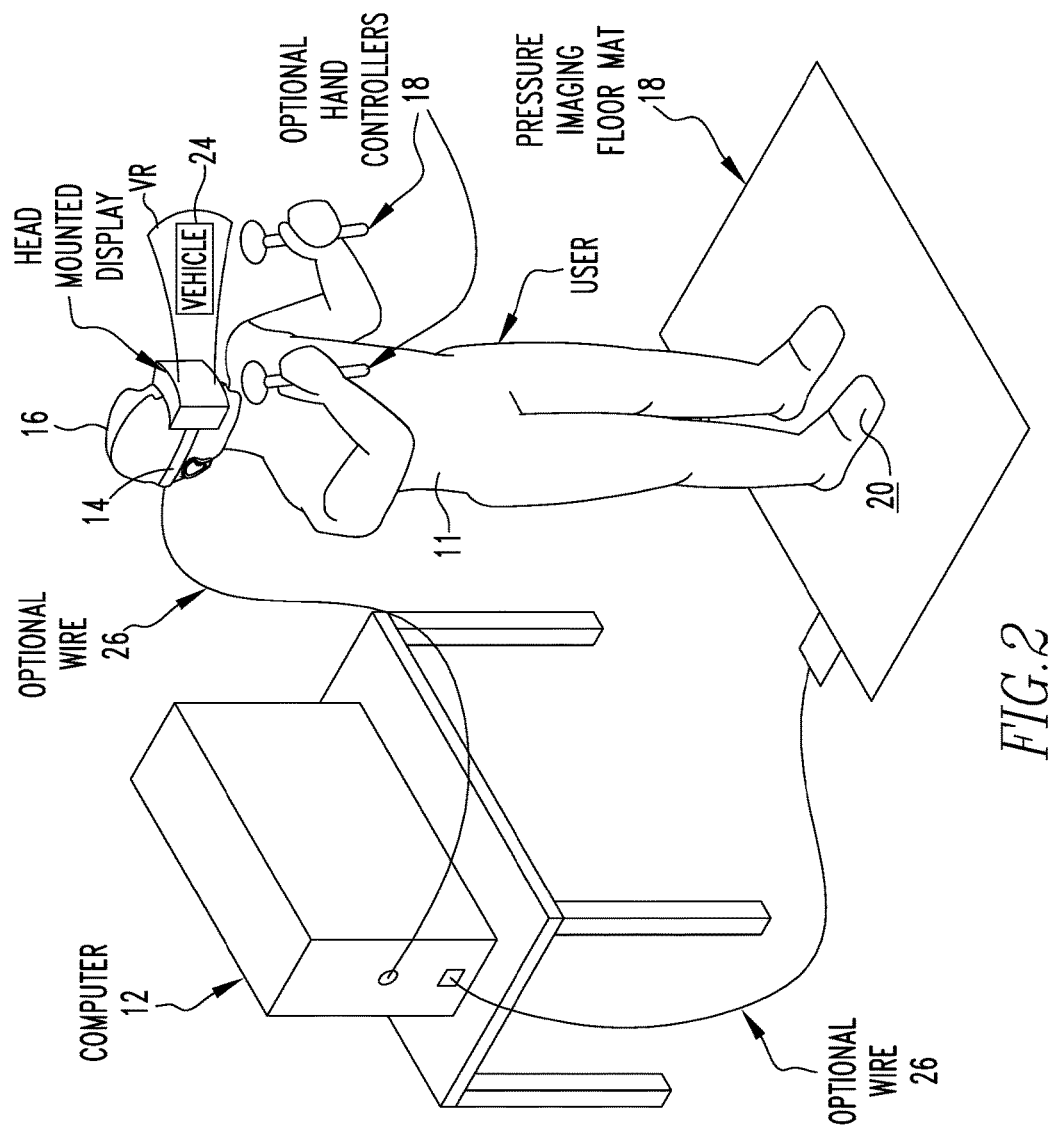
FIG. 2 is a schematic representation of the present invention.

Referring now to the drawings wherein like reference numerals refer to similar or identical parts throughout the several views, and more specifically to FIGS. 1 and 2 thereof, there is shown an apparatus 10 for creating movement in a virtual reality for a user 11. The apparatus 10 comprises a computer 12. The apparatus 10 comprises a virtual reality headset 14 in communication with the computer 12 that is worn on the head 16 of the user 11 so the user 11 sees the virtual reality shown by the headset 14 and produced by the computer 12 in the headset 14. The apparatus 10 comprises a foot controller 18 in communication with the computer 12 against which the user 11 moves at least one of his feet to create control signals with the foot 20 to cause movement in the virtual reality shown by the headset.

The control signals from a time-varying pressure variation on the bottoms of the feet of the user 11 may be used by the computer 12 to create a moving vehicle 24 in virtual reality. The movement of the vehicle 24 created by the computer 12 in virtual reality may be either a rolling, sliding, sailing, hovering or flying moving vehicle 24. The control signals may provide controls that always maintain static balance for the user's body and are used together with visual feedback from visuals in the virtual reality created by the computer 12 which convey a degree and direction of physical tilt and roll consistent with a reactive force to an illusory lateral movement that the user 11 perceives as downward with respect to the user's body.

The control signals may be created with isometric gestures with each individual foot 20 of the user 11. The control signals may provide a total number of linearly separable dimensions of control that the user 11 can impart to the pressure imaging surface is at least 12, six dimensions per foot 20. The control signals may be created from auxiliary foot 20 gestures of toe curl which provide for linearly separable dimensions of control for the user 11 in the virtual reality created by the computer 12.

For each foot 20 of the user 11, the six dimensions may fall into two classes, with a first class having three kinematic dimensions: one kinematic dimension for forward or rearward position of the foot 20 upon the foot controller 18, one kinematic direction for side to side position of the foot 20 upon the foot controller 18, and one kinematic dimension of turning the foot 20 inward or outward about a vertical axis of the user's ankle, and a second class having three dynamic dimensions: one dynamic dimension for a total pressure of the foot 20 upon the foot controller 18, one dynamic dimension for how weight of the foot 20 is distributed back onto a heel versus forward onto a forefoot, and one dynamic dimension for how the weight of the foot 20 is distributed onto the inner edge of the foot 20, otherwise called pronation, versus an outer edge of the foot 20, otherwise called supination.

Figure 3:
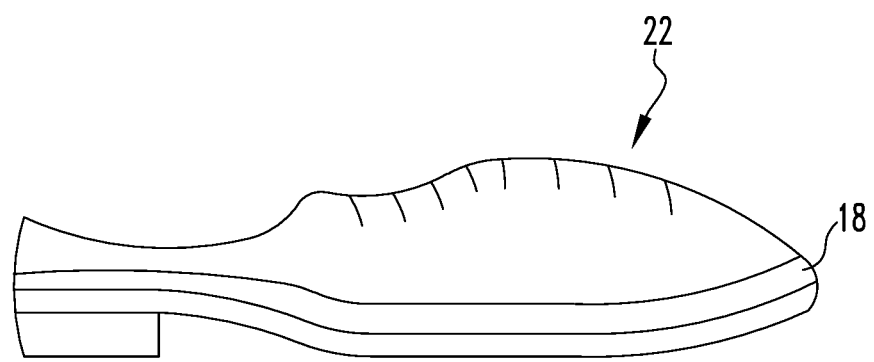
FIG. 3 is a representation of a shoe with a foot controller.

The control signals may be created using intermittent control gesture events by lifting 1 foot 20 off of the foot controller 18 and placing the foot 20 back down onto the foot controller 18. The foot controller 18 may be disposed only within the user's shoes 22 or foot 20 apparel, as shown in FIG. 3. The apparatus 10 may include a hand controller 28 from which control signals are provided to the computer 12 for the virtual reality.

The present invention pertains to a method for creating movement in a virtual reality for a user 11. The method comprises the steps of the user 11 seeing the virtual reality shown by a virtual headset 14 and produced by a computer 12 in the headset 14, a virtual reality headset 14 in communication with the computer 12 that is worn on the head 16 of the user 11. There is the step of the user 11 moving at least one of his feet against a foot controller 18 to create control signals with the foot 20 to cause movement in the virtual reality by the computer 12, the foot controller 18 in communication with the computer 12.

There may be the step of using by the computer 12 control signals from my time-varying pressure variation on the bottoms of the feet of the user 11 to create a moving vehicle 24 in virtual reality. There may be the step of the computer 12 moving the vehicle 24 created by the computer 12 in virtual reality is either rolling, sliding, sailing, hovering or flying. There may be the step of the control signals providing controls that always maintain static balance for the user's body and are used together with visual feedback from visuals in the virtual reality created by the computer 12 which convey a degree and direction of physical tilt and roll consistent with a reactive force to an illusory lateral movement that the user 11 perceives as downward with respect to the user's body.

There may be the step of creating the control signals with isometric gestures with each individual foot 20 of the user 11. The control signals may provide a total number of linearly separable dimensions of control that the user 11 can impart to the pressure imaging surface of at least 12, six dimensions per foot 20. There may be the step of creating the control signals from auxiliary foot 20 gestures of toe curl which provide for linearly separable dimensions of control for the user 11 in the virtual reality created by the computer 12. There may be the step of using a hand controller 28 by the user 11 to create control signals.

In the operation of the invention, a pressure imaging device is used to image the time-varying pressure variation on the bottoms of the feet of the user 11. This time-varying pressure image is then used to create what appears to the user 11 of the virtual reality experience as a rolling, sliding, sailing, hovering or flying moving vehicle 24, which the user 11 perceives as transporting him/her around within the virtual reality world.

The user 11 can be wearing a virtual reality headset 14, and can also be holding one or more hand-held controllers. The use of the described invention frees the user 11 from needing to use gestures with the head 16 or hand controllers 28 for navigation, thereby freeing those parts of the body for other, non-navigational tasks, such as playing computer 12 games or pointing or picking up and moving objects or looking at or gesturing toward other people in a social context.

The current invention differs in the following way from the control of a self-balancing vehicle 24 in the physical world that is operated by its user's feet, such as a skateboard or Segway or drift-board: Because the user 11 in a virtual reality experience is not physically moving within the world, and therefore does not have the opportunity to lean his or her weight laterally to compensate for physical displacement, it is necessary to design the user 11 experience in such a way that perceived lateral movement is compensated for in such a way that the user 11 perceives linear acceleration forces upon his/her body to be in the vertical direction. For this reason, the current invention is designed to provide controls that always maintain static balance for the user's body, and are used together with visual feedback from the visuals in the virtual reality experience created by the computer 12 that convey a degree and direction of physical tilt and roll consistent with a reactive force to the illusory lateral movement that the user 11 will perceive as downward with respect to his or her body. This will prevent the user 11 from attempting to compensate for perceiving himself or herself as being out of balance, and therefore falling over in an attempt to compensate for this perceived imbalance.

The use of a pressure imaging mat has specific advantages over the use of a simpler foot 20 operated device, such as physical pedals or the Nintendo Wii Balance Board and similar force-plate devices.

One advantage of the current invention is that the user 11 can make control signals are created with isometric gestures with each individual foot 20—that is, gestures which do not require the feet ether to be physically moved in a lateral direction or to be lifted nor are entirely dependent upon lateral shifts in the user's center of mass. This (1) allows a more subtle and continuous mode of control than such devices afford, and (2) allows implementation of a vocabulary of variations in foot 20 gesture upon the mat surface which keeps the user 11 of the device always in static balance.

The control signals provide a total number of linearly separable dimensions of control that a user 11 can impart to the pressure imaging surface is at least twelve—six dimensions per foot 20. In addition to this basic twelve-dimensional space, more dimensions can be added if auxiliary foot 20 gestures of toe curl provide control signals for linearly separable dimensions of control for the VR. The gesture control strategies which will follow are all based on combinations of this linearly separable multidimensional control space.

For each foot 20, the above-mentioned six dimensions fall into two classes: (1) Three kinematic dimensions: one for forward/rearward position of the foot 20 upon the mat, one for side to side position of the foot 20 upon the mat, and one dimension of turning the foot 20 inward or outward about the vertical axis of the user's ankle, and (2) Three dynamic dimensions: one for the total pressure of the foot 20 upon the mat, one for how that weight is distributed back onto the heel versus forward onto the forefoot, and one for how that weight is distributed onto the inner edge of the foot 20 (pronation) versus the outer edge of the foot 20 (supination).

Within this space of possible control strategies are (1) forward-facing strategies that support the illusion that the primary forward movement of the vehicle 24 is in the direction that the user's body is physically facing, as when riding a Segway or drift board or a Hiller flying platform, and, alternately, (2) lateral-facing strategies that support the illusion that the primary forward movement of the vehicle 24 is at some non-zero angle to the direction that the user's body is physically facing, as when riding a skateboard.

In both cases it is possible, although not necessary, to use this invention to control a simulation of a vehicle 24 that has four holonomic dimensions of differential movement: (1)

Forward/backward, (2) Left/right, (3) Rotation about the vertical axis, and (4) Vertical lift.

In addition to the various possible continuous isometric operational controls in which both feet are on the ground, and all control is done through varying pressure continuously upon the pressure imaging surface, it is also possible to create intermittent control gesture events by lifting one foot 20 off of the foot controller 18 and placing the foot 20 back down onto the foot controller 18 or more feet, then optionally moving the lifted foot 20 laterally, then placing the foot 20 back onto the surface in some position and orientation. In this last step of the control gesture, the portion of the foot 20 which first impinges on the surface—which can be either the center of the foot 20 or some point on the periphery of the footprint—can serve as an additional identifier of the control gesture.

One example among the many possible forward-facing strategies for navigation control using the current invention is: (1) User 11 leans from side to side to "bank" (as if standing on a hovercraft platform), (2) user 11 puts differentially more weight on the right toe, as opposed to the entire right foot 20, in order to accelerate, in a gesture roughly analogous to pressing the accelerator pedal in an automobile, (3) user 11 puts differentially more weight on the left toe, as opposed to the entire left foot 20, in order to decelerate, in a gesture roughly analogous to pressing the brake pedal in an automobile, (4) user 11 goes up on both toes, thereby placing a greater proportion of total weight on both toes, in order to gain vertical lift for the virtual vehicle 24 being operated, (5) user 11 bends his or her knees, which moves the pelvis backward and thereby places a greater proportion of total weight on both heels, in order to reduce vertical lift, (6) user 11 puts weight on the toe of one foot 20 while putting weight on the heel of the other foot 20 to spin vertically in place.

Alternate gestures that can be used in alternate control strategies, which also always maintain static balance for the user 11, include using supination of the feet (placing more weight differentially on the outer edges of the feet) in order to indicate greater vertical lift for the virtual vehicle 24 being operated, or pronation of the feet (placing more weight differentially on the inner edges of the feet) in order to indicate smaller vertical lift for the virtual vehicle 24 being operated.

One example among the many possible lateral-facing strategies of a navigation control using the current invention is one whereby the user 11 positions one foot 20 (the "rearward foot") toward the direction opposite to virtual travel and pointed to one side, while positioning the other foot 20 (the "forward foot") toward the direction of virtual travel and pointed forward. In one example control strategy using this physical arrangement: (1) User 11 varies relative weight between the two feet to effect forward or backward acceleration, (2) user 11 puts greater differential weight on the toe or heel of the forward foot 20 to increase or reduce vertical lift, (3) user 11 puts greater differential weight on the toe of the rearward foot 20 to effect leftward or rightward lateral acceleration, (5) user 11 uses supination or pronation of the forward foot 20 to cause the vehicle 24 to rotate about its vertical axis.

For each instance in which a shift in weight—either between the feet or of the center of pressure within a single foot 20—produces a change in virtual acceleration, it is useful to have a central "dead region" in which small variations from the average value do not have any effect on the numerical output result. This avoids the situation whereby users inadvertently move the vehicle 24 due to small and unintentional shifts in center of pressure.

Nothing within the current invention depends upon the user 11 of hand controllers 28, nor requires their presence. However it is useful to note that the presence of hand controllers can add richness to the interaction with the virtual vehicle 24. For example, vertical lift can be alternately affected by a manual gesture that the user 11 makes using one or more hand controllers 28. For example, the user 11 could squeeze the trigger control on the right-hand controller 28 to increase elevation of the virtual vehicle 24, and squeeze the trigger control on the left-hand controller 28 to decrease elevation.

In one method of interaction, the pressure sensing system sends to the computer 12 the time-varying pressure image of the feet upon the mat. Software on the computer 12 then parses said data into commands for the system. In the case where weight shifts translate into directional movement, the center of pressure (the mean value of the forces relative to the initial center of pressure) would indicate the direction of movement. The overall system could then use that information in much the same manner as a standard joystick controller.

Another method of using the invention for interaction might be, but is not limited to, creating designated areas of the sensing device such that each such section acts as a specific type of interaction mechanism. One example might be, but is not limited to, that the pressure imaging floor mat might be divided into four discrete areas, where each quadrant acts as a specific type of interaction controller. One type of such a controller acts as a pressure sensitive button that provides a time-varying reading of the total force currently being applied to that region. This continuous value can then be thresholded in software into multiple discrete values to implement a multi-threshold switch. If there is only one such threshold, then the controller acts as a simple on-off switch, sending to the computer 12 a TRUE value for a total pressure that attains a predetermined threshold, and a FALSE value for a total pressure below this threshold. Another type of such a controller acts as a joystick, which measures the continuous time-varying value of the center of pressure across one or more axes. This continuous value can then be thresholded in software into multiple discrete values to implement discrete controllers. For example, thresholding into only two levels implements a rocker switch.

The VR application can then use these interactions much as they would any standard game controller or other standard human input device.

Foot 20 disambiguation: There are several methods by which different objects, including but not limited to feet can be identified distinctly with the current invention. One method of identifying feet would be to include the sensors only within the user's shoes 22 or other foot 20 apparel worn by the user 11. If the sensing system is below the user 11 as part of the flooring or on top of the floor but below the user's feet and foot 20 apparel, as in a floor mat embodiment, then identification of the feet may be accomplished in a number of ways, including but not limited to dividing the area of expected interaction for one foot 20 and the other foot 20 in such a way that the user 11 is expected to put his or her left foot 20 in a specific location and his or her right foot 20 in another specific location. Another method would be to look at contour maps of the pressure and compare that image data to an expected image of a left and right foot 20, comparing them to expected images of right and left feet using conformal maps to preserve image and scale of such images. Alternatively, a machine learning algorithm such as a Bayesian classifier or Support Vector Machine can be used to identify and classify each foot 20 as either a right or left foot 20.

Physical Components of the Invention:

Computer, which can be a IBM/PC architecture with an Intel Core i5-4590 CPU and a GeForce GTX 970 GPU.

VR Head Mounted Display (HMD), which can be a Valve/HTC VIVE virtual reality headset 14.

Pressure imaging floormat system, which can be a 36"× 24" pressure imaging floor mat from Tactonic Technologies, with 0.5" sensel spacing and hardware interpolation between sensels. See U.S. patent application Ser. Nos. 13/943,593; 13/317,131 and U.S. Pat. No. 9,158,369, all of which are incorporated by reference herein.

VR hand controllers (optional), which can be Valve/HTC VIVE hand controllers.

The pressure imaging system connects to the computer using a USB, Bluetooth, or other standard communication protocol. The data may be processed and used to emulate an existing HID device, such as a keyboard, joystick, or other controller, utilizing existing interaction API's. The raw pressure imaging data may also be used to create customized actions, as content developers desire. One example of emulating a standard HID device would be to use the time varying pressure imaging data to emulate the A, S, W, and D keys of a QUERTY keyboard. These keys are often used in video games to translate a character's position within the game environment. Using the present invention the corresponding translation of the game character within the virtual environment can be determined by the change in overall center of pressure for the user's feet or other feet-operated gestures as described above.

In one possible such mapping: placing more weight on the left foot 20 triggers the "A" key, placing more weight on the right foot 20 triggers the "D" key, placing more of the right foot's weight differentially on the right toe triggers the "W" key, and placing more of the left foot's weight differentially on the left toe triggers the "S" key. In addition to simply emulating the keyboard characters traditionally used for such interactions, developers can use the pressure data and the magnitude of change in center of mass or other foot 20 operated gesture by the user 11 to modify the speed of the movement, as opposed to using a constant speed as is currently most common.

The VR system and the pressure imaging systems may be connected to the same computer 12, or to different computers, but the data or at least the desired actions resulting from the data from both will eventually reside in the same system.

Hand controllers, while not required, may be useful in allowing users to perform more precise or complicated actions and gestures and will generally be connected to the same computer 12 as the VR headset 14.

The pressure imaging system will send to the controlling computer system via a standard communication protocol, such as but not limited to USB or Bluetooth, a signal to activate the sensing system, then receive time varying surface pressure data. The data may be raw data such as an array of data from the sensor array, or the data may be representative of a specifically expected controller.

In the embodiment where the raw sensor data is provided to the host computer 12, libraries will then process the data for each frame sent across the communication BUS and either provide a parsed version of the data for developers to then determine the interactions or the data will be parsed then used to emulate an expected control mechanism/HID device such as but not limited to a game controller or standard qwerty keyboard, whereby interaction software can then use that information to cause directed interaction for the user 11 based on shifts in weight and foot 20 positions.

Thus, one can create quite elaborate controls for a user 11 using just variations in pressure through the bottoms of the user's feet. The hand controller 28 is not really necessary at all in this invention. All that is described herein regarding the use of the foot 20 or feet and the foot controller 18 is not that it can be done together with a hand controller 28, but that it can be done even if one doesn't use a hand controller 28. This is in contrast to, for example, the use of a force plate under the feet, as exemplified by the Nintendo WiiFit BalanceBoard, which can only detect a single center of pressure (it cannot even distinguish between two feet).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for creating movement in a virtual reality for a user comprising:
    a computer;
    a virtual reality headset in communication with the computer that is worn on the head of the user so the user sees the virtual reality shown by the headset and produced by the computer in the headset; and
    a foot controller in communication with the computer against which the user moves at least one of his feet to create control signals with the foot to cause movement in the virtual reality shown by the headset, the control signals from a time-varying pressure variation on the bottoms of the feet of the user are used by the computer to create a moving vehicle in virtual reality, the movement of the vehicle created by the computer in virtual reality is either a rolling, sliding, sailing, hovering or flying moving vehicle, the control signals provide controls that always maintain static balance for the user's body and are used together with visual feedback from visuals in the virtual reality created by the computer which convey a degree and direction of physical tilt and roll consistent with a reactive force to an illusory lateral movement that the user perceives as downward with respect to the user's body, wherein the control signals are created with isometric gestures with each individual foot of the user, the control signals provide a total number of linearly separable dimensions of control that the user can impart to a pressure imaging surface of the foot controller is at least 12, six dimensions per foot.

2. The apparatus of claim 1 wherein for each foot of the user, the six dimensions fall into two classes, with a first class having three kinematic dimensions: one kinematic dimension for forward or rearward position of the foot upon the foot controller, one kinematic direction for side to side position of the foot upon the foot controller, and one kinematic dimension of turning the foot inward or outward about a vertical axis of the users ankle, and a second, class having three dynamic dimensions: one dynamic dimension for a total pressure of the foot upon the foot controller, one dynamic dimension for how weight of the foot is distributed back onto a heel versus forward onto a forefoot, and one dynamic dimension for how the weight of the foot is distributed onto the inner edge of the foot, otherwise called pronation, versus an outer edge of the foot, otherwise called supination.

3. The apparatus of claim 2 wherein the control signals are created using intermittent control gesture events by lifting 1 foot off of the foot controller and placing the foot back down onto the foot controller.

4. The apparatus of claim 3 wherein the foot controller is disposed only within the user's shoes or foot apparel.

5. The apparatus of claim 4 including a hand controller from which control signals are provided to the computer for the virtual reality.

6. A method for creating movement in a virtual reality for a user comprising the steps, of:

the user seeing the virtual reality shown by a virtual headset and produced by a computer in the headset, the virtual reality headset in communication with the computer that is worn on the head of the user; and the user moving at least one of his feet against a foot controller to create control signals with the foot to cause movement in the virtual reality by the computer, the foot controller in communication with the computer, including the step of using by the computer control signals from a time-varying pressure variation on the bottoms of the feet of the user to create a moving vehicle in virtual reality, including the step of the computer moving the vehicle created by the computer in virtual reality is either rolling, sliding, sailing, hovering or flying, including the step of the control signals providing controls that always maintain static balance for the user's body and are used together with visual feedback from visuals in the virtual reality created by the computer which convey a degree and direction of physical tilt and roll consistent with a reactive force to an illusory lateral movement that the user perceives as downward with respect to the user's body, including the step of creating the control signals with isometric gestures with each individual foot of the user, the control signals provide a total number of linearly separable dimensions of control that the user can impart to a pressure imaging surface of the foot controller is at least 12, six dimensions per foot.

7. The method of claim 6 including the step of using a hand controller by the user to create control signals.

8. A computer software program for creating movement in a virtual reality for a user stored in a non-transient memory comprising the computer-generated steps of:

creating the virtual reality shown by a virtual headset and produced by the computer in the headset for the user to see, the virtual reality headset in communication with the computer that is worn on the head of the user, and causing movement in the virtual reality by the computer based on control signals created by the user moving at least one of the user's feet against a foot controller, the foot controller in communication with the computer, including the step of using by the computer control signals from a time-varying pressure variation on the bottoms of the feet of the user to create a moving vehicle in virtual reality, including the step of the computer moving the vehicle created by the computer in virtual reality is either rolling, sliding, sailing, hovering or flying, including the step of the control signals providing controls that always maintain static balance for the user's body and are used together with visual feedback from visuals in the virtual reality created by the computer which convey a degree and direction of physical tilt and roll consistent with a reactive force to an illusory lateral movement that the user perceives as downward with respect to the user's body, including the step of creating the control signals with isometric gestures with each individual foot of the user, the control signals provide a total number of linearly separable dimensions of control that the user can impart to a pressure imaging surface of the foot controller is at least 12, six dimensions per foot.

* * * * *